United States Patent
Yamamoto et al.

(10) Patent No.: US 9,582,893 B2
(45) Date of Patent: Feb. 28, 2017

(54) MOTION VECTOR DETECTOR, DISTANCE DETECTOR, MOTION VECTOR DETECTION METHOD AND COMPUTER PROGRAM PRODUCT

(71) Applicant: KABUSHIKI KAISHA TOSHIBA, Minato-ku, Tokyo (JP)

(72) Inventors: Takuma Yamamoto, Kanagawa (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 14/689,568

(22) Filed: Apr. 17, 2015

(65) Prior Publication Data
US 2015/0310626 A1    Oct. 29, 2015

(30) Foreign Application Priority Data
Apr. 24, 2014    (JP) .................................. 2014-090111

(51) Int. Cl.
G06K 9/48       (2006.01)
G06T 7/20       (2006.01)
H04N 5/14       (2006.01)

(52) U.S. Cl.
CPC .......... G06T 7/2013 (2013.01); G06T 7/2066 (2013.01); H04N 5/145 (2013.01);
(Continued)

(58) Field of Classification Search
CPC ................. G06T 7/2013; G06T 7/2066; G06T 2207/20016; G06T 2207/20021;
(Continued)

(56) References Cited

U.S. PATENT DOCUMENTS

2002/0009144 A1 * 1/2002 Ishihara ................ G06T 7/2013
                                                    375/240.16
2005/0053291 A1 * 3/2005 Mishima ................ H04N 7/014
                                                    382/236
(Continued)

FOREIGN PATENT DOCUMENTS

JP       08-265778       10/1996
WO       2011/074121     6/2011

OTHER PUBLICATIONS

Horn, B. et al, "Determining Optical Flow," Artificial Intelligence, Aug. 1981, pp. 185-203.

*Primary Examiner* — Samir Ahmed
(74) *Attorney, Agent, or Firm* — Nixon & Vanderhye, P.C.

(57) ABSTRACT

According to an embodiment, a motion vector detector includes a searcher, a converter, a synthesizer, and a corrector. The searcher is configured to search for, in each block in a first image having a resolution of interest, an area having a high degree of correlation with a second image having the resolution of interest, and generate a first flow representing a set of motion vectors having the resolution of interest. The converter is configured to generate a second flow representing a set of motion vectors having the resolution of interest from a set of motion vectors having a higher resolution. The synthesizer is configured to generate a third flow representing a set of motion vectors having the resolution of interest. The corrector is configured to generate a set of motion vectors having the resolution of interest by optimizing gradient objective function having initial value set to the third flow.

17 Claims, 5 Drawing Sheets (52) U.S. Cl.
CPC ............ *G06T 2207/10012* (2013.01); *G06T 2207/10016* (2013.01); *G06T 2207/20016* (2013.01); *G06T 2207/20021* (2013.01)

(58) Field of Classification Search
CPC  G06T 2207/10016; G06T 2207/10012; H04N 5/144
See application file for complete search history.

(56) References Cited

U.S. PATENT DOCUMENTS

| | | | |
|---|---|---|---|
| 2006/0126952 A1* | 6/2006 | Suzuki | G06T 5/002 382/233 |
| 2006/0203915 A1* | 9/2006 | Wada | H04N 19/513 375/240.16 |
| 2006/0285596 A1* | 12/2006 | Kondo | G06T 7/2013 375/240.16 |
| 2009/0225227 A1* | 9/2009 | Nozawa | G06T 7/2013 348/699 |
| 2012/0213285 A1 | 8/2012 | Yamamoto et al. | |
| 2013/0120235 A1* | 5/2013 | Takaya | G09G 3/3648 345/102 |
| 2013/0300827 A1* | 11/2013 | Ueno | H04N 13/0285 348/43 |

* cited by examiner

MOTION VECTOR DETECTOR, DISTANCE DETECTOR, MOTION VECTOR DETECTION METHOD AND COMPUTER PROGRAM PRODUCT

CROSS-REFERENCE TO RELATED APPLICATION

This application is based upon and claims the benefit of priority from Japanese Patent Application No. 2014-090111, filed on Apr. 24, 2014; the entire contents of which are incorporated herein by reference.

FIELD

An embodiment described herein relates generally to a motion vector detector, a distance detector, a motion vector detection method, and a computer program product.

BACKGROUND

Typically, as far as methods for detecting motion vectors are concerned, a method based on block matching and a method based on the gradient technique are known. In the method based on block matching, for example, for each block in a reference image, an area having the highest degree of correlation of pixels is detected in a target image; and the motion vectors are detected on a block-by-block basis. Thus, in the method based on block matching, although it is possible to detect relatively large motions in a stable manner, it is not possible to detect motion vectors on a pixel-by-pixel basis.

In the method based on the gradient technique, such motion vectors are calculated which enable achieving minimization of a gradient-technique objective function. Thus, in the method based on the gradient technique, although motion vectors can be detected on a pixel-by-pixel basis, it is not possible to detect large motions.

As a method of making up for the disadvantage of the method based on the gradient technique, a method is known in which motion vectors based on the gradient technique are calculated using an objective function that has the initial value set to the motion vectors calculated according to the method based on block matching. However, in the method based on the gradient technique, it is not possible to detect motions equal to or larger than a certain level. Hence, in this particular method, only minor corrections are possible with respect to the motion vectors detected according to the method based on block matching. For that reason, if the motions in a single block undergo variation equal to or greater than a certain level, then this particular method leads to cancellation of the variation of the motions in that block. As a result, the motion vectors cannot be detected with accuracy.

Meanwhile, regarding a hierarchical search in which motion vectors are detected in a stepwise manner from images having lower resolutions to images having higher resolutions, a method is known in which the gradient-technique-based motion vectors are calculated using an objective function that has the initial value set to the motion vectors calculated according to the method based on block matching. In this method, the processing result at one of the levels of low resolution is used as the initial value for searching the motion vectors according to the method based on block matching. However, in this method, if there is false detection at one of the levels of low resolution, then it becomes difficult to correct that error in the next level.

DETAILED DESCRIPTION

According to an embodiment, a motion vector detector includes a searcher, a resolution converter, a synthesizer, and a corrector. The searcher is configured to search for, in each block in a first input image having a resolution of interest that is a predetermined resolution, an area having a high degree of correlation with a second input image having the resolution of interest, and generate a first flow that represents a set of motion vectors having the resolution of interest. The resolution converter is configured to generate a second flow that represents a set of motion vectors having the resolution of interest by changing a set of motion vectors having a lower resolution than the resolution of interest to have a higher resolution. The synthesizer is configured to generate a third flow that represents a set of motion vectors having the resolution of interest by combining motion vectors included in the first flow and motion vectors included in the second flow in such a way that a gradient-technique objective function is optimized. The corrector is configured to generate a set of motion vectors having the resolution of interest by optimizing a gradient-technique objective function having initial value set to the third flow.

An exemplary embodiment of a motion vector detector according to the invention is described below in detail with reference to the accompanying drawings. The motion vector detector according to the embodiment can detect motion vectors with accuracy on a pixel-by-pixel basis; and to detect correct motion vectors regardless of whether an error has occurred in the motion vectors at a lower resolution.

Figure 1:
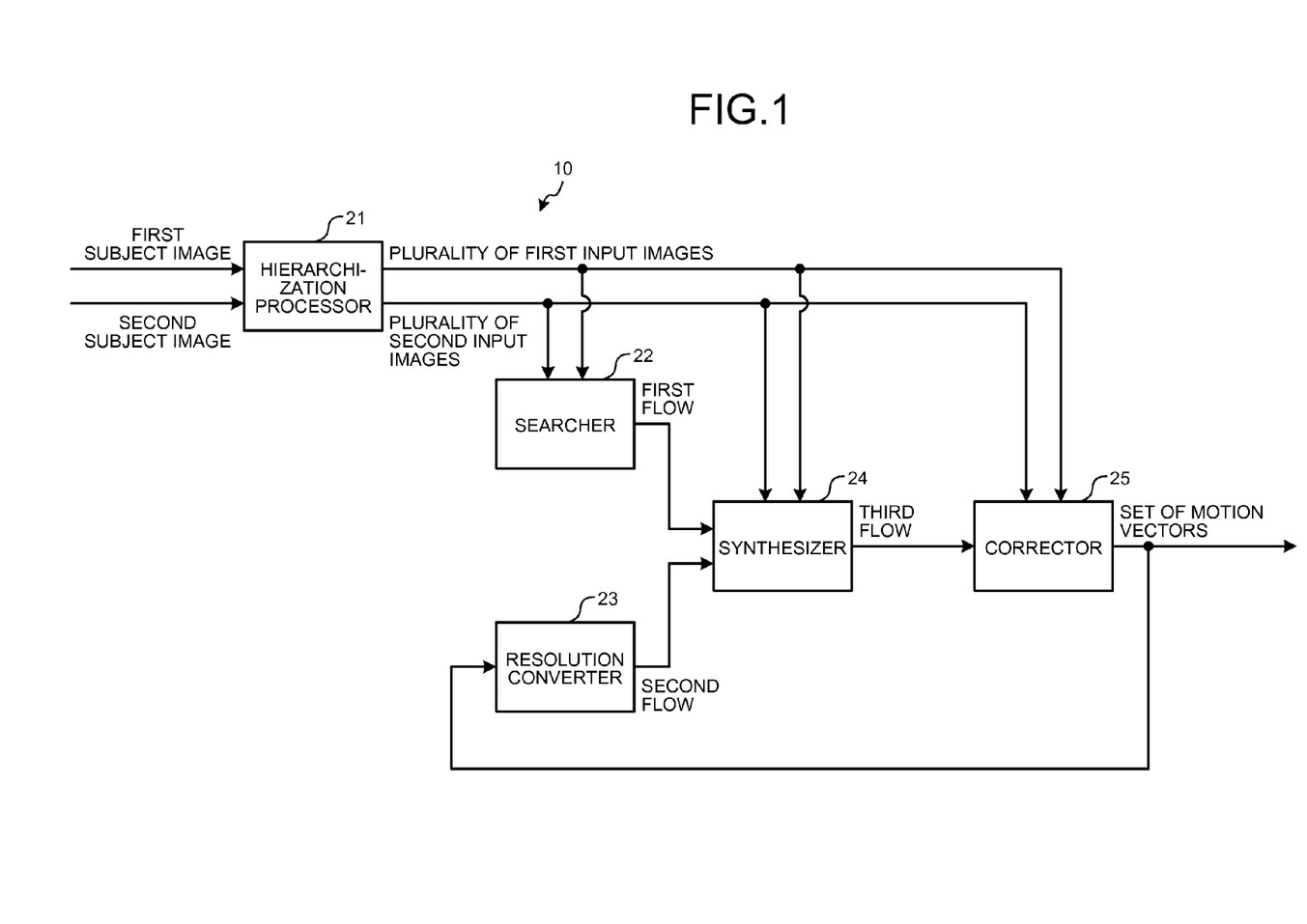
FIG. 1 is a diagram illustrating a motion vector detector according to an embodiment.

FIG. 1 is a diagram illustrating a motion vector detector 10 according to the embodiment. The motion vector detector 10 includes a hierarchization processor 21, a searcher 22, a resolution converter 23, a synthesizer 24, and a corrector 25.

The hierarchization processor 21 obtains a first subject image and a second subject image. Herein, the first subject image and the second subject image can be two images captured at different timings or can be images in which the same subject is captured from different positions. More particularly, the first subject image and the second subject image can be successive frames of video data or can be stereo images captured by a stereo camera.

The hierarchization processor 21 converts a first subject image into a plurality of first input images having different resolutions. The hierarchization processor 21 may apply a Gaussian filter and perform subsampling in a repeated manner with respect to a first input image, and generate a plurality of first input images having different resolutions. Instead of applying a Gaussian filter, the hierarchization processor 21 may apply a blur filter such as a mean filter. Moreover, instead of performing subsampling, the hierarchization processor 21 may perform interpolation such as linear interpolation or bi-cubic interpolation for the purpose of image reduction. Furthermore, the hierarchization processor 21 may treat the first input image having the highest resolution as the first subject image.

The hierarchization processor 21 converts a second subject image into a plurality of second input images having same resolutions as a plurality of first input images. Herein, the hierarchization processor 21 can generate a plurality of second input images according to the same method as the method implemented for generating a plurality of first input images. Then, the hierarchization processor 21 outputs a plurality of first input images and a plurality of second input images to the searcher 22, the synthesizer 24, and the corrector 25.

Each of the searcher 22, the resolution converter 23, the synthesizer 24, and the corrector 25 sequentially selects resolutions, starting from the lowest resolution to the highest resolution, of a plurality of first input images (and a plurality of second input images) as the resolution of interest; and performs processes with respect to the selected resolution.

The searcher 22 receives input of the first input image having the resolution of interest and the second input image having the resolution of interest from the hierarchization processor 21. Then, in each block in the first input image having the resolution of interest, the searcher 22 searches for an area having a high degree of correlation with the second input image having the resolution of interest; and generates a first flow that represents a set of motion vectors having the resolution of interest.

The searcher 22 may generate the first flow by means of template matching. Specifically, the searcher 22 may detect the correlation between the patterns of pixel values in a block or may detect the correlation between the features calculated based on the pixel values in a block. The method of detecting the correlation between the patterns of pixel values in a block and then detecting the motion vectors is equivalent to the method of retrieving the motion vectors by means of block matching.

Examples of the features, which are calculated based on the pixel values in a block, include SIFT features (SIFT stands for Scale-Invariant Feature Transform) and HOG features (HOG stands for Histograms of Oriented Gradients). However, the features are not limited to these examples, and it is also possible to use other types of image features.

Meanwhile, a block may be of any size and any shape. For example, a block may represent an entire image. If a block represents an entire image, then the searcher 22 detects the motions in the entire image, that is, detects the global motion.

Meanwhile, as far as detecting the motion vectors of the target block for processing is concerned, the searcher 22 may detect the motion vectors calculated from any one of the following: the already-detected motion vectors around the target block for processing; the already-detected motion vectors in a temporally-past image or a temporally-future image than the first input image and the second input image; and the already-detected motion vectors during the operations performed with respect to the lower resolutions than the resolution of interest.

In the case of detecting any motion vector from such already-detected motion vectors; for example, the searcher 22 stores, in a memory, the motion vectors detected in the past; selects the most suitable motion vector according to a predetermined algorithm; and sets the selected motion vector as the motion vector of the target block for processing. As far as the method of selecting the most suitable motion vector from the already-detected motion vector is concerned, for example, methods are disclosed in Japanese Patent No. 3147893 and International Publication No. WO2011/074121. Meanwhile, at the lowest resolution, that is, when the lowest resolution is the resolution of interest; the searcher 22 may output the first flow in which all motion vectors are equal to zero.

The resolution converter 23 obtains, from the corrector 25, a set of motion vectors having a lower resolution by one level than the resolution of interest. Then, the resolution converter 23 changes the set of motion vectors, which has a lower resolution by one level than the resolution of interest, to have the resolution higher by one level and generates a second flow that represents a set of motion vectors having the resolution of interest. Meanwhile, at the lowest resolution, that is, when the lowest resolution is the resolution of interest; the resolution converter 23 does not perform any operation.

More particularly, firstly, the resolution converter 23 interpolates the set of motion vectors having a lower resolution by one level than the resolution of interest in such a way that the set of motion vectors has the same resolution as the resolution of interest. Herein, the resolution converter 23 may interpolate the motion vectors according to linear interpolation or bi-cubic interpolation.

Then, the resolution converter 23 enlarges the size of each motion vector by a predetermined enlargement ratio. For example, if k represents the enlargement ratio and $\hat{w}_{expand}^h$ represents the set of post-interpolation motion vectors obtained after interpolation of the set of motion vectors having a lower resolution by one level; then the resolution converter 23 calculates Equation (1) given below and generates the second flow ($w_{expand}^h$).

$$w_{expand}^h = k\hat{w}_{expand}^h \tag{1}$$

Herein, the enlargement ratio k represents the ratio of the resolution of the set of post-conversion motion vectors (i.e., the resolution of interest) with respect to the resolution of the set of pre-conversion motion vectors. For example, if 10×10 dpi is the resolution of the set of pre-conversion motion vectors and if 30×30 dpi is the resolution of interest, then the enlargement ratio k is 30/10=3. Meanwhile, the resolution converter 23 can perform interpolation after performing the enlargement operation.

The synthesizer 24 receives input of the first flow having the resolution of interest from the searcher 22, and receives input of the second flow having the resolution of interest from the resolution converter 23. Moreover, the synthesizer 24 receives input of the first input image having the resolution of interest and the second input image having the resolution of interest from the hierarchization processor 21. Then, the synthesizer 24 combines the motion vectors included in the first flow and the motion vectors included in the second flow in such a way that the gradient-technique objective function is optimized, and generates a third flow that represents the set of motion vectors having the resolution of interest. Meanwhile, at the lowest resolution, that is, when the lowest resolution is the resolution of interest; the synthesizer 24 outputs the first flow as the third flow.

As an example, the synthesizer 24 can generate the third flow by minimizing an objective function for adding a first evaluation value, which corresponds to an image formed by subtracting the second input image from the first input image corrected using a set of motion vectors to be calculated (hereinafter, target motion vectors) and a second evaluation value, which corresponds to the gradient of the set of the target motion vectors. In this case, in the formula for calculation of at least one of the first evaluation value and the second evaluation value, the synthesizer 24 can use the objective function including the L1 norm. Meanwhile, the details regarding the objective function used in the synthesizer 24 are given later.

The corrector 25 receives input of the third flow having the resolution of interest from the synthesizer 24. Moreover, the corrector 25 receives input of the first input image having the resolution of interest and the second input image having the resolution of interest from the hierarchization processor 21. Then, the corrector 25 optimizes the gradient-technique objective function that has the initial value set to the third flow, and generates a set of motion vectors having the resolution of interest.

As an example, the corrector 25 may generate the set of motion vectors having the resolution of interest by minimizing an objective function for adding a first evaluation value, which corresponds to an image formed by subtracting the first input image from the second input image corrected using the set of target motion vectors, and a second evaluation value, which corresponds to the gradient of the set of the target motion vectors. In this case, in the formula for calculation of at least one of the first evaluation value and the second evaluation value, the corrector 25 may use the objective function including the L1 norm. Meanwhile, the details regarding the objective function used by the corrector 25 are given later.

During the processes other than the processes for the highest resolution, that is, when the highest resolution is not the resolution of interest; the corrector 25 outputs the calculated set of motion vectors to the resolution converter 23. However, during the processing of the highest resolution, that is, when the highest resolution is the resolution of interest; the corrector 25 outputs the calculated set of motion vectors to the outside.

Figure 2:
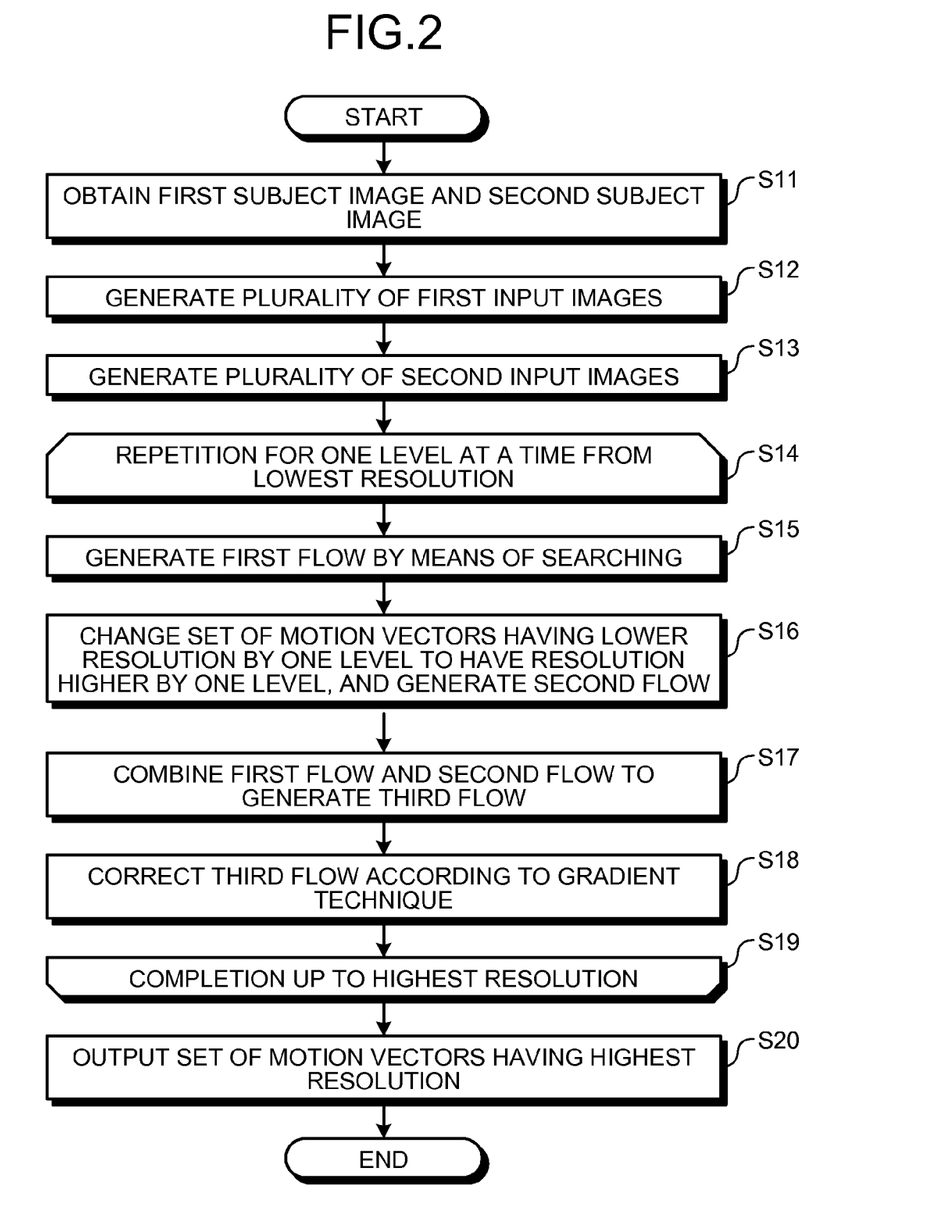
FIG. 2 is a diagram for explaining a sequence of operations performed in the motion vector detector according to the embodiment.
Figure 3:
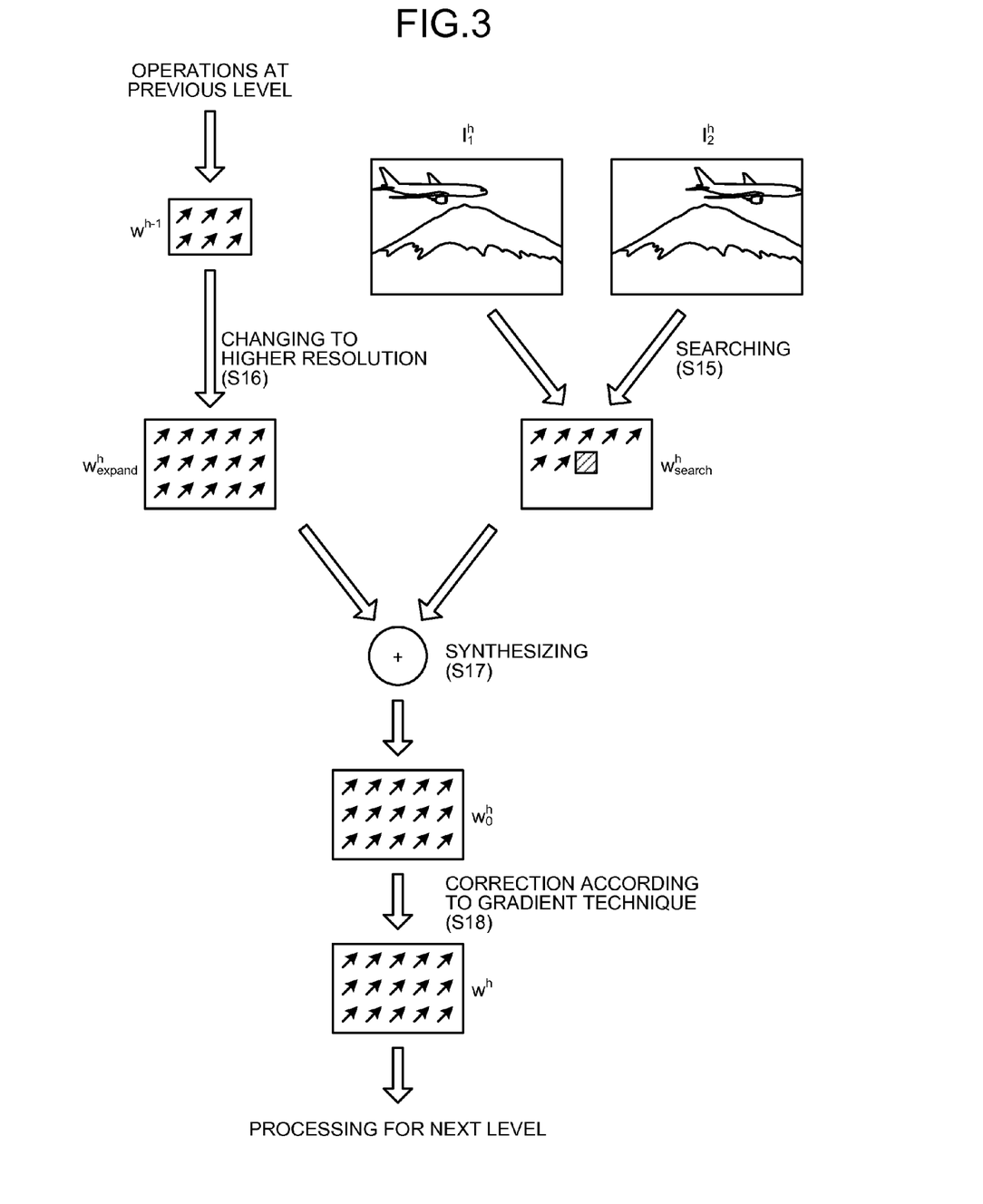
FIG. 3 is a diagram illustrating a set of motion vectors at each step.

FIG. 2 is a diagram for explaining a sequence of processes performed in the motion vector detector 10 according to the embodiment. FIG. 3 is a diagram illustrating a set of motion vectors at each step.

Firstly, the hierarchization processor 21 obtains a first subject image and a second subject image (S11). Then, the hierarchization processor 21 generates, from the first subject image, a plurality of first input images having different resolutions (S12). Moreover, the hierarchization processor 21 generates, from the second subject image, a plurality of second input images having different resolutions (S13).

Subsequently, in the motion vector detector 10, resolutions starting from the lowest resolution to the highest resolution of the plurality of first input images (and the plurality of second input images) are sequentially selected as the resolution of interest; and processes from S15 to S18 (a loop between S14 to S19) are repeatedly performed on a resolution-by-resolution basis. Regarding the steps performed in the loop between S14 and S19, the processes with respect to a predetermined resolution (the resolution of interest) are explained with reference to FIG. 3.

For each block in the first input image ($I_1^h$) having the resolution of interest, the searcher 22 searches for an area having a high correlation with the second input image ($I_2^h$) having the resolution of interest, and generates a first flow ($w_{search}^h$) that represents the set of motion vectors having the resolution of interest (S15).

Then, the resolution converter 23 changes a set ($w^{h-1}$) of motion vectors, which has a lower resolution by one level than the resolution of interest, to have the resolution higher by one level and generates a second flow ($w_{expand}^h$) that expand represents the set of motion vectors having the resolution of interest (S16). Herein, the set ($w^{h-1}$) of motion vectors having a lower resolution by one level than the resolution of interest represents the set of motion vectors obtained at S18 during the previous loop. Meanwhile, at the lowest resolution, that is, during the first loop; the resolution converter 23 does not perform the operation at S16.

Subsequently, the synthesizer 24 combines the motion vectors included in the first flow ($w_{search}^h$) and the motion vectors included in the second flow ($w_{expand}^h$) in such a way that the gradient-technique objective function is optimized, and generates a third flow ($w_o^h$) representing the set of motion vectors having the resolution of interest (S17). Meanwhile, at the lowest resolution, that is, during the first loop; the synthesizer 24 outputs the first flow ($w_{expand}^h$) having the resolution of interest as the third flow ($w_o^h$) having the resolution of interest.

Then, the corrector 25 optimizes the gradient-technique objective function that has the initial value set to the third flow ($w_o^h$) and generates a set ($w^h$) of motion vectors having the resolution of interest (S18).

Subsequently, in the motion vector detector 10, during the processes other than the processes for the highest resolution, the system control returns to S15 and the processes are performed for a higher resolution by one level (S19). In the motion vector detector 10, when the processes are completed for the highest resolution, the system control proceeds to S20.

Then, in the motion vector detector 10, the set ($w^h$) of motion vectors having the highest resolution is output to the outside (S20).

Meanwhile, at the lowest resolution, that is, during the first loop; the searcher 22 can output the first flow in which all motion vectors are equal to zero. In this case, the corrector 25 optimizes the gradient-technique objective function that has the initial value set to the third flow having all motion vectors equal to zero. As a result, in the motion vector detector 10, in the case in which the first input image and the second input image have a low resolution and in which the motions in entire images can be sufficiently detected according to the gradient technique, it is possible to skip the process for detecting the motion vectors performed by the searcher 22. That enables achieving simplification of the processes.

Given below is the explanation about the objective function used in the synthesizer 24 (S17) and about the method of optimizing the objective function. With the aim of minimizing a gradient-technique objective function E(w) given below in Equation (2), the synthesizer 24 combines, in units of pixels, the motion vectors included in the first flow ($w_{search}^h$) and the motion vectors included in the second flow ($W_{expand}^h$) and generates the third flow ($W_o^h$) representing the set of motion vectors having the resolution of interest.

$$E(w) = \sum_{p \in \Omega} \psi_D(I_1^h(p+w) - I_2^h(p)) + \alpha \psi_S(\nabla w) \qquad (2)$$

In Equation (2), w represents, as given below in Equation (3), the set (flow) of motion vectors in which the motion vectors included either in the first flow ($w_{search}^h$) or in the second flow ($w_{expand}^h$) are selected in units of pixels.

$$w \in \{w_{expand}^h, w_{search}^h\} \qquad (3)$$

Meanwhile, in Equation (2), Ω represents a set of position vectors of the pixels included in an image.

Moreover, in Equation (2), $I_1^h(p+w)$ represents a first input image obtained after the correction performed using the set (w) of target motion vectors. Furthermore, in Equation (2), $I_2^h(p)$ represents a second input image. Thus, in Equation (2), $(I_1^h(p+w)-I_2^h(p))$ represents a difference image formed by subtracting the second input image from the first input image that is obtained after the correction performed using the set (w) of target motion vectors.

Furthermore, in Equation (2), $\psi_D(\ )$ and $\psi_S(\ )$ represent cost functions that convert difference values into scalar values representing costs. As an example, $\psi_D(\ )$ and $\psi_S(\ )$ may represent the L1 norm. Alternatively, $\psi_D(\ )$ and $\psi_S(\ )$ may represent the L2 norm, or can be a robust function such as the Charbonnier function. Moreover, $\psi_D(\ )$ and $\psi_S(\ )$ may be mutually different functions. Meanwhile, in Equation (2), α represents a parameter that is set in an arbitrary manner by the designer.

Thus, in Equation (2), $\psi_D(I_1^h(p+w)-I_2^1(p))$ represents a scalar value (a first evaluation value) obtained from the difference image, which is formed by subtracting the second input image from the first input image that is obtained after the correction performed using the set (w) of target motion vectors, using the cost function $\psi_D(\ )$. Moreover, in Equation (2), $\alpha\psi_S(\nabla w)$ represents a scalar value (a second evaluation value) obtained using the cost function $\psi_S(\ )$ from the gradient of the set of target motion vectors.

Thus, in Equation (2), the objective function E(w) represents a value that is obtained when the value of addition of the first evaluation value and the second evaluation value is added for all pixels.

The synthesizer 24 combines the motion vectors of the first flow ($w_{search}^h$) and the motion vectors of the second flow ($w_{expand}^h$) in such a way that the objective function E(w) is minimized. This problem of minimizing the objective function E(w) is, what is called, a labeling problem. Thus, the synthesizer 24 can implement, for example, the graphcut method or the belief propagation method and calculate the set (flow) of motion vectors that enables minimization of the objective function E(w).

Given below is the explanation about the objective function used by the corrector 25 (at S18) and about the method of optimizing the objective function. The corrector 25 generates the set ($w^h$) of motion vectors having the resolution of interest in such a way that the gradient-technique objective function, which has the initial value set to the third flow ($w_o^h$) and which is given below in Equation (4), is minimized.

$$E(u, v) = \sum_{p \in \Omega} \psi_D(I_2^h(p+w) - I_1^h(p)) + \alpha\psi_S(\nabla w) \quad (4)$$

In Equation (4), w is expressed as [u, v]'. Herein, u and v represent vector elements.

Moreover, in Equation (4); Ω, $\psi_D(\ )$, $\psi_S(\ )$, and α are identical as in Equation (2). However, $\psi_D(\ )$, $\psi_S(\ )$, and α may be different functions or values than Equation (2).

Furthermore, in Equation (4), $I_2^h(p+w)$ represents a second input image obtained after the correction performed using the set (w) of target motion vectors. Moreover, in Equation (4), $I_1^h(p)$ represents a first input image. Thus, in Equation (4), $(I_2^h(p+w)-I_1^h(p))$ represents a difference image formed by subtracting the first input image from the second input image that is obtained after the correction performed using the set (w) of target motion vectors.

Thus, in Equation (4), $\psi_D(I_2^h(p+w)-I_1^h(p))$ represents a scalar value (a first evaluation value) obtained from the difference image, which is formed by subtracting the first input image from the second input image that is obtained after the correction performed using the set (w) of target motion vectors, using the cost function $\psi_D(\ )$. Moreover, in Equation (4), $\alpha\psi_S(\nabla w)$ represents a scalar value (a second evaluation value) obtained using the cost function $\psi_S(\ )$ from the gradient of the set of target motion vectors.

Meanwhile, Equation (4) is non-convex function. Thus, using Equation (4), it is not possible to obtain the smallest value with ease. Hence, if the motion vectors are resolved in an equation having a fixed value w and a micro increment dw (=[du, dv]$^T$), then Equation (4) gets modified into Equation (5) given below.

$$E(du, dv) = \sum_{p \in \Omega} \psi_D(I_2^h(p+w+dw) - I_1^h(p)) + \alpha\psi_S(\nabla(w+dw)) \quad (5)$$

In Equation (5), the first member is a nonlinear function. Thus, if the second order term on ward in the first member of Equation (5) that has been subjected to Taylor expansion are deleted, then Equation (5) gets modified into Equation (6) given below.

$$E(du, dv) = \sum_{p \in \Omega} \psi_D(I_x(p)du(p) + I_y(p)dv(p) + I_z(p)) + \alpha\psi_S(\nabla(w+dw)) \quad (6)$$

In Equation (6); $I_x(p)$, $I_y(p)$, and $I_z(p)$ are expressed in the form of Equation (7-1), Equation (7-2), and Equation (7-3), respectively, given below.

$$I_x(p) = \frac{\partial}{\partial x}I_2^h(p+w) \quad (7\text{-}1)$$

$$I_y(p) = \frac{\partial}{\partial y}I_2^h(p+w) \quad (7\text{-}2)$$

$$I_z(p) = I_2^h(p+w) - I_1^h(p) \quad (7\text{-}3)$$

Herein, Equation (6) is a convex function. Thus, if the third flow ($w_o^h$) is substituted as the initial value in Equation (6) and if ∂E/∂w=0 is solved; then the corrector 25 can obtain the smallest value of the objective function. More particularly, since ∂E/∂w=0 is a simultaneous linear equation; the corrector 25 can implement, for example, the SOR method (SOR stands for Successive Over Relaxation) or the conjugate gradient method, and solve ∂E/∂w=0 so as to obtain the smallest value of the objective function.

In this way, in the motion vector detector 10 according to the embodiment, motion vectors are detected using the gradient technique. Therefore, in the motion vector detector 10, the motion vectors can be detected with accuracy on a pixel-by-pixel basis.

Moreover, in the motion vector detector 10, the set of motion vectors detected by means of template matching is used as the initial value of the gradient-technique objective function. Thus, in the motion vector detector 10, it becomes possible to detect larger motion vectors than the detectable range of the gradient technique.

Moreover, in the motion vector detector 10, the set of motion vectors detected by means of template matching (i.e., the first flow) and the set of motion vectors obtained by increasing the resolution of the set of motion vectors that is detected at a lower resolution by one level (i.e., the second flow) are combined in such a way that the gradient-technique objective function is optimized. Then, in the motion vector detector 10, the combined set of motion vectors (i.e., the third flow) is used as the initial value of the gradient-technique objective function.

As a result, in the motion vector detector 10, even if incorrect motion vectors are included the set of motion vectors that is detected at a lower resolution by one level, the incorrect motion vectors can be replaced with the motion vectors detected by means of template matching. Therefore, in the motion vector detector 10, regardless of whether an error has occurred in the motion vectors at a lower resolution, it is possible to detect correct motion vectors.

Figure 4:
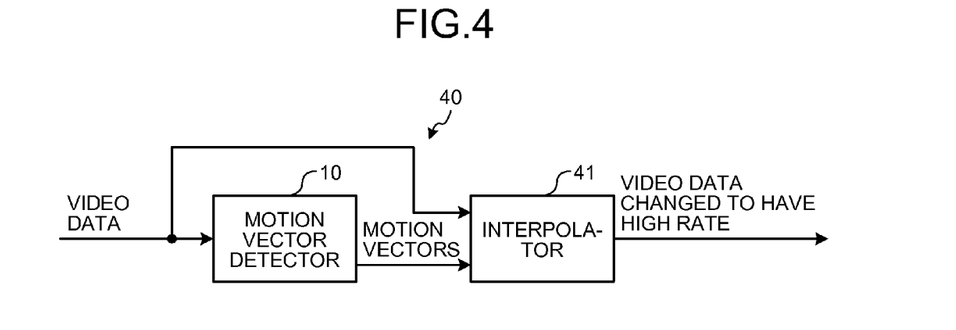
FIG. 4 is a diagram illustrating an image interpolation device.

FIG. 4 is a diagram illustrating an image interpolation device 40 in which the motion vector detector 10 according to the embodiment is implemented. For example, the motion vector detector 10 can be implemented in the image interpolation device 40 that interpolates the frames of video data such as TV footage.

The image interpolation device 40 includes the motion vector detector 10 and an interpolator 41. In this example, the motion vector detector 10 receives input of video data and detects motion vectors between two successive images. More particularly, the motion vector detector 10 detects the set w of motion vectors between a frame (image) $I_t$ at a particular timing t and a frame (image) $I_{t+1}$ at the next timing t+1.

The interpolator 41 performs interpolation between two images using the set of motion vectors detected by the motion vector detector 10, and generates a new image. In this example, the interpolator 41 receives input of video data; performs interpolation between two successive frames using the set of motion vectors generated by the motion vector detector 10; and generates a new frame. Then, the interpolator 41 inserts the newly-generated frame in between the two successive frames in the video data, and outputs video data changed to have a high rate.

More particularly, as the frame to be inserted in between the frame $I_t$ at the timing t and the frame $I_{t+1}$ at the next timing t+1, the interpolator 41 generates a frame $I_{t+0.5}$ at the timing t+0.5. Herein, the interpolator 41 generates a value I'(p) of each pixel of the frame $I_{t+0.5}$ according to Equation (8) given below.

$$I'(p) = \frac{1}{2}(I_t(p-w'(p)) + I_{t+1}(p-w'(p))) \quad (8)$$

In Equation (8), the definition of w'( ) is as given below in Equation (9).

$$w'(p+\frac{1}{2}w(p)) = \frac{1}{2}w(p) \quad (9)$$

Figure 5:
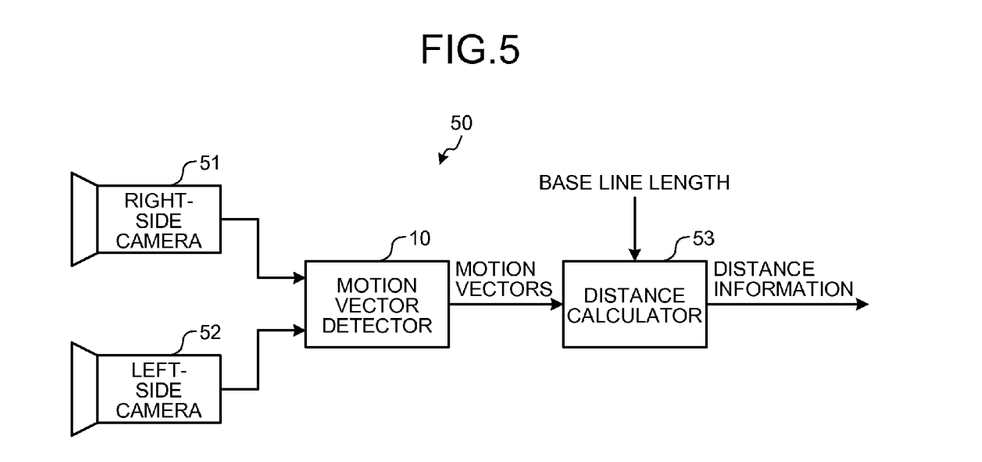
FIG. 5 is a diagram illustrating a distance detector.

FIG. 5 is a diagram illustrating a distance detector 50 in which the motion vector detector 10 according to the embodiment is implemented. The motion vector detector 10 can be implemented in the distance detector 50 that, for example, detects distances to objects.

The distance detector 50 includes a right-side camera 51, a left-side camera 52, the motion vector detector 10, and a distance calculator 53.

The right-side camera 51 and the left-side camera 52 are positioned apart from each other by a predetermined distance (base line length) in the horizontal direction. The right-side camera 51 and the left-side camera 52 bring the same subject into focus and capture images of that subject.

The motion vector detector 10 receives input, as the first subject image and the second subject image, the images captured by the right-side camera 51 and the left-side camera 52, respectively; and detects the motion vectors of the subject.

The distance calculator 53 calculates the distance to the subject based on the set of motion vectors detected by the motion vector detector 10. More particularly, the distance calculator 53 makes use of the principle of triangulation and calculates the distance from the imaging positions to the subject based on the base line length and the length of motion vectors. Then, the distance calculator 53 outputs distance information that indicates the calculated distance.

Figure 6:
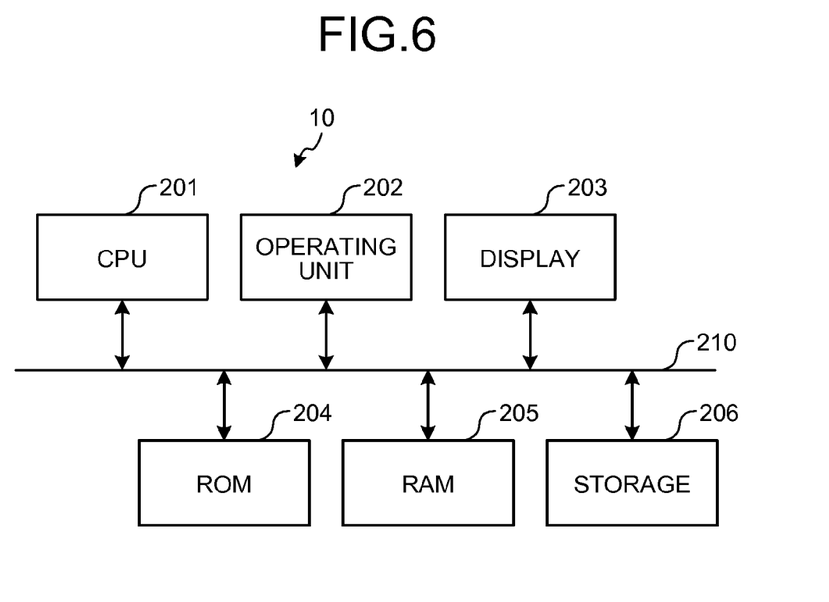
FIG. 6 is a diagram illustrating a hardware configuration of the motion vector detector according to the embodiment.

FIG. 6 is a diagram illustrating a hardware configuration of the motion vector detector 10. Herein, the motion vector detector 10 includes a central processing unit (CPU) 201, an operating unit 202, a display 203, a read only memory (ROM) 204, a random access memory (RAM) 205, and a storage 206. Moreover, these constituent elements are connected to each other by a bus 210.

The CPU 201 is a processor that performs computations and control operations according to computer programs. The CPU 201 uses a predetermined area in the RAM 205 as the work area, and performs various processes in cooperation with various computer programs stored in advance in the ROM 204 or the storage 206. As a result, the hierarchization processor 21, the searcher 22, the resolution converter 23, the synthesizer 24, and the corrector 25, which constitute the motion vector detector 10, are implemented.

The operating unit 202 is an input device such as a mouse or a keyboard that receives, as instruction signals, information that is input by a user; and outputs the instruction signals to the CPU 201.

The display 203 is a display device such as a liquid crystal display (LCD). Based on display signals received from the CPU 201, the display 203 displays a variety of information. For example, the display 203 may display the motion vectors output by the motion vector detector 10.

The ROM 204 is used to store, in a non-rewritable manner, the computer programs and a variety of setting information used in controlling the motion vector detector 10. The RAM 205 is a volatile memory medium such as a synchronous dynamic random access memory (SDRAM). Herein, the RAM 205 serves as the work area for the CPU 201. More particularly, the RAM 205 serves as a buffer for temporarily storing various variables and parameters used by the motion vector detector 10.

The storage 206 is a rewritable recording device in the form of a semiconductor storage medium such as a flash memory, or in the form of a storage medium in which data can be stored in magnetic or optical manner. The storage 206 is used to store the computer programs and a variety of information used in controlling the motion vector detector 10. Moreover, for example, the storage 206 is used to store data, such as image signals, that is obtained via the operating unit 202 and a communication device.

Meanwhile, the motion vector detector 10 is not limited to the abovementioned configuration. Alternatively, the configuration may be such that at least some of the hierarchization processor 21, the searcher 22, the resolution converter 23, the synthesizer 24, and the corrector 25 are implemented using hardware circuitry (such as a semiconductor integrated circuit).

The computer programs executed in the motion vector detector 10 are stored as installable or executable files in a computer-readable storage medium such as a compact disk read only memory (CD-ROM), a flexible disk, a compact disk readable (CD-R), or a digital versatile disk (DVD), which may be provided as a computer program product.

Alternatively, the computer programs executed in the motion vector detector 10 according to the embodiment may be saved as downloadable files on a computer connected to a network such as the Internet or may be made available for distribution through a network such as the Internet. Alternatively, the computer programs executed in the motion vector detector 10 according to the embodiment may be stored in advance in a ROM.

The computer programs executed in the motion vector detector 10 according to the embodiment contain a module for each of the constituent elements of the motion vector detector 10 (i.e., the hierarchization processor 21, the searcher 22, the resolution converter 23, the synthesizer 24, and the corrector 25). The CPU 201 (a processor) reads the computer programs from a storage medium and runs them such that the computer programs are loaded in the RAM 205. As a result, the constituent elements of the motion vector detector 10 (i.e., the hierarchization processor 21, the searcher 22, the resolution converter 23, the synthesizer 24, and the corrector 25) are generated in the RAM 205.

While a certain embodiment has been described, the embodiment has been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A motion vector detector comprising:
a memory; and
a circuit coupled with the memory and configured to:
search for, in each block in a first input image having a resolution of interest that is a predetermined resolution, an area having a high degree of correlation with a second input image having the resolution of interest, and generate a first flow that represents a set of motion vectors having the resolution of interest;
generate a second flow that represents a set of motion vectors having the resolution of interest by changing a set of motion vectors having a lower resolution than the resolution of interest to have a higher resolution;
generate a third flow that represents a set of motion vectors having the resolution of interest by combining motion vectors included in the first flow and motion vectors included in the second flow in such a way that a gradient-technique objective function is optimized; and
generate a set of motion vectors having the resolution of interest by optimizing a gradient-technique objective function having initial value set to the third flow.

2. The motion vector detector according to claim 1, wherein the circuit is configured to output a plurality of first input images having different resolutions and a plurality of second input images having same resolutions as the plurality of first input images,
the circuit is configured to sequentially select resolutions, starting from lowest resolution to highest resolution, of the plurality of first input images as the resolution of interest, and perform operations on a resolution-by-resolution basis, and
the circuit is configured to obtain, a set of motion vectors having a lower resolution by one level than the resolution of interest to generate the second flow having the resolution of interest.

3. The motion vector detector according to claim 2, wherein
the circuit is configured not to perform processes at lowest resolution, and
the circuit is configured to output, at lowest resolution, the first flow as the third flow.

4. The motion vector detector according to claim 3, wherein
the circuit is configured to output, at lowest resolution, the first flow in which all motion vectors are equal to zero, and
the circuit is configured to optimize a gradient-technique objective function that has initial value set to the third flow having all motion vectors equal to zero.

5. The motion vector detector according to claim 1, wherein the circuit is configured to generate the third flow by minimizing an objective function for adding a first evaluation value and a second evaluation value, the first evaluation value corresponding to an image obtained by subtracting the second input image from the first input image that has been corrected using a set of motion vectors to be calculated, the second evaluation value corresponding to gradient of the set of motion vectors to be calculated.

6. The motion vector detector according to claim 5, wherein the circuit is configured to use the objective function including L1 norm in a formula for calculation of at least one of the first evaluation value and the second evaluation value.

7. The motion vector detector according to claim 1, wherein the circuit is configured to generate a set of motion vectors having the resolution of interest by minimizing an objective function for adding a first evaluation value and a second evaluation value, the first evaluation value corresponding to an image obtained by subtracting the first input image from the second input image that has been corrected using a set of motion vectors to be calculated, the second evaluation value corresponding to gradient of the set of motion vectors to be calculated.

8. The motion vector detector according to claim 7, wherein the circuit uses the objective function including L1 norm in a formula for calculation of at least one of the first evaluation value and the second evaluation value.

9. The motion vector detector according to claim 1, wherein the circuit is configured to detect correlation of patterns of pixel values of the block or correlation of features calculated based on pixel values of the block.

10. The motion vector detector according to claim 1, wherein the circuit is configured to detect, as motion vectors of a target block for processing, motion vectors calculated from any one of already-detected motion vectors around the target block for processing, already-detected motion vectors in a temporally-past image or a temporally-future image than the first input image and the second input image, and already-detected motion vectors during processes for lower resolutions than the resolution of interest.

11. The motion vector detector according to claim 1, wherein the circuit comprises a processor that executes computer programs.

12. The motion vector detector according to claim 1, wherein the circuit comprises an integrated circuit.

13. An image interpolation device comprising:
the motion vector detector according to claim 1 to detect motion vectors between two images; and
the circuit is configured to generate a new image by interpolating the two images using a set of the motion vectors detected by the motion vector detector.

14. The device according to claim 13, wherein
the motion vector detector is configured to detect motion vectors between frames included in video data, and
the circuit is configured to insert, in between the frames included in the video data, a new frame generated by performing interpolation.

15. A distance detector comprising:
a motion vector detector according to claim 1 to detect motion vectors between two images obtained by capturing a same subject from different positions, respectively; and
the circuit is configured to calculate distance to the subject based on the motion vectors detected by the motion vector detector.

16. A motion vector detection method comprising:
searching for, in each block in a first input image having a resolution of interest that is a predetermined resolution, an area having a high degree of correlation with a second input image having the resolution of interest;
generating a first flow that represents a set of motion vectors having the resolution of interest;
generating a second flow that represents a set of motion vectors having the resolution of interest by changing a set of motion vectors having a lower resolution than the resolution of interest to have a higher resolution;
generating a third flow that represents a set of motion vectors having the resolution of interest by combining motion vectors included in the first flow and motion vectors included in the second flow in such a way that a gradient-technique objective function is optimized; and
generating a set of motion vectors having the resolution of interest by optimizing a gradient-technique objective function having initial value set to the third flow.

17. A computer program product comprising a non-transitory computer-readable medium containing a program which, when executed by a computer for detecting motion vectors, causes the computer to execute:
searching for, in each block in a first input image having a resolution of interest that is a predetermined resolution, an area having a high degree of correlation with a second input image having the resolution of interest;
generating a first flow that represents a set of motion vectors having the resolution of interest;
generating a second flow that represents a set of motion vectors having the resolution of interest by changing a set of motion vectors having a lower resolution than the resolution of interest to have a higher resolution;
generating a third flow that represents a set of motion vectors having the resolution of interest by combining motion vectors included in the first flow and motion vectors included in the second flow in such a way that a gradient-technique objective function is optimized; and
generating a set of motion vectors having the resolution of interest by optimizing a gradient-technique objective function having initial value set to the third flow.

* * * * *